May 2, 1944.     R. H. BLANCHARD     2,347,872
RUBBER OUTSOLE FOR FOOTWEAR
Filed May 26, 1942
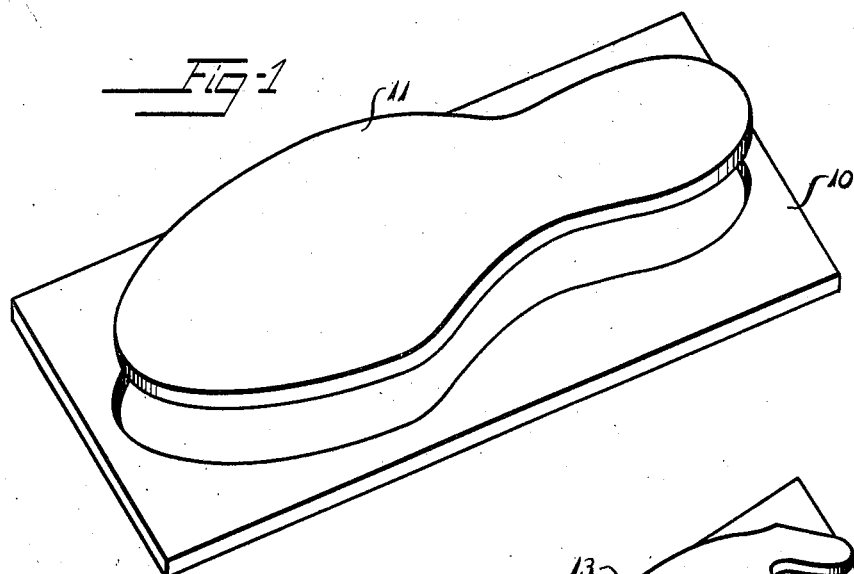
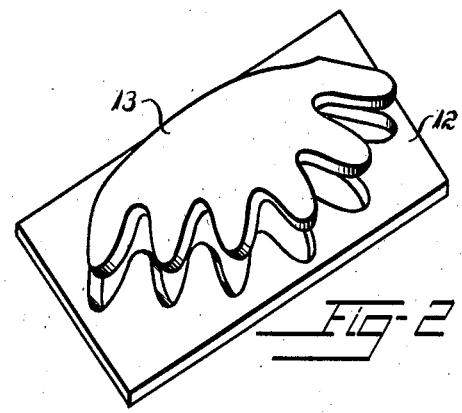
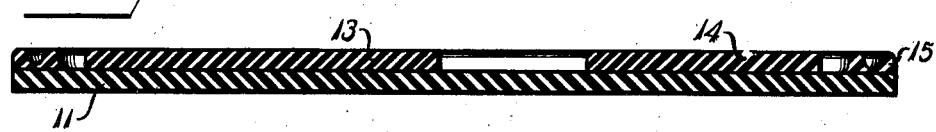
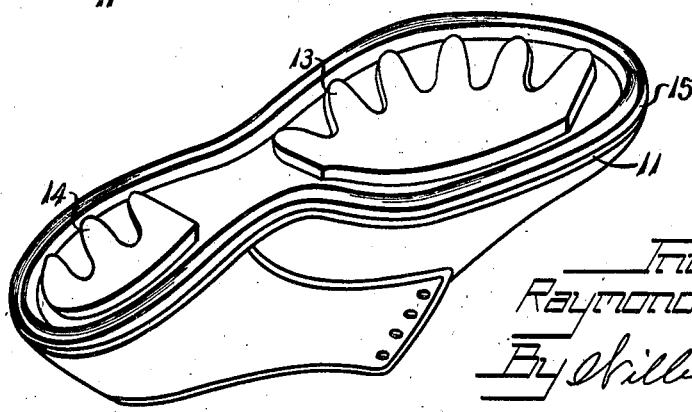
Inventor
Raymond H. Blanchard
By Willis F. Avery
Atty.

Patented May 2, 1944

2,347,872

UNITED STATES PATENT OFFICE 2,347,872

RUBBER OUTSOLE FOR FOOTWEAR

Raymond H. Blanchard, Melrose, Mass., assignor to The B. F. Goodrich Company, New York, N. Y., a corporation of New York Application May 26, 1942, Serial No. 444,504

5 Claims. (Cl. 12—142)

This invention relates to the manufacture of footwear and particularly to the provision of rubber outsoles for footwear of various types.

It is common practice to provide the rubber outsoles of certain types of footwear, such as basketball or other sport shoes, with deep indentations and high projections on the tread face of the outsole in order to improve the appearance and prevent slipping when the wearer walks or runs across smooth surfaces. These designs, because of their depth, are difficult to calender on by calendering rolls as the outsoles are too often ruined. In the past the most common way of making these outsoles has been to mold the soles in molds provided with mold plates having the particular design required. By this method the rubber sole is partially vulcanized in the mold, the sole assembled with the rest of the shoe parts, and the entire shoe assembly, including the sole, is completely vulcanized. This method is uneconomical for a number of reasons, of which the chief ones are the expensiveness of the mold design plates, the excessive labor costs caused by the number of handling operations involved, and the low production rates obtained. There is an additional disadvantage to this method due to the necessary preliminary part-vulcanization in the mold. Because of this preliminary treatment the conditions must be very carefully controlled in order to prevent either over-curing or under-curing of the sole when the shoe assembly is vulcanized in the final manufacturing step.

There has also been another method proposed for making shoes with soles of the type here under discussion. This method involves providing a die member with a desired design cut in it. By this method the die member is heated, pressed into a sheet of calendered unvulcanized rubber, and the rubber, with the die member in contact therewith, is suddenly chilled. This imprints the design in the rubber and the chilling tends to cause the rubber to retain the design stamped in it so that the shoe can be assembled and the entire shoe assembly then vulcanized. This method also leaves much to be desired as there is considerable expense involved in the heating and chilling operations, and there is also considerable time lost in the manufacturing cycle due to the delays while the rubber is being heated and chilled.

The object of the present invention is to provide a method of making shoes having outer soles provided with deep designs on the tread portion thereof in a manner more simple and economical than any heretofore proposed.

The manner in which this object, and others, is attained will be readily understood by the following description of a typical embodiment of the invention and by reference to the accompanying drawing, of which Fig. 1 is a perspective view illustrating a preliminary step in the practice of my invention and showing more particularly the manner in which a base element for the outsole is prepared;

Fig. 2 is a perspective view similarly illustrating a manner in which tread elements for the outsole may be prepared;

Fig. 3 is a cross-sectional view taken longitudinally through an outsole assembly prepared in accordance with the invention; and Fig. 4 is a perspective view of a completed shoe embodying an outsole assembly made in accordance with the invention.

In a typical embodiment of the invention, as illustrated in the accompanying drawing, a sheet of calendered or other unvulcanized rubber 10 is provided and from this sheet there is cut a rubber outsole base element 11 comprising heel, shank, and sole portions. The base element preferably is of substantially uniform thickness throughout and usually will have smooth faces although some shallow surface marking is permissible. From a similar sheet of unvulcanized rubber 12 there is cut a deeply configured tread element 13 with one smoothly curved edge and with outwardly extending fingers describing the other edges. In a similar manner a second deeply configured tread element 14 is cut from a sheet of calendered unvulcanized rubber. Also, a rand element 15 is calendered from unvulcanized rubber, this rand, in cross-section, preferably comprises a flat base, two upstanding peaks, and a depression between the peaks.

In the manufacturing operations involved in building a shoe, the rubber outsole base element 11 is placed with the tread side up for easy accessibility. The rand element 15 is placed around the edge of the sole with the peaks up. The first configured tread element 13 is placed in position on the sole portion of the outsole with the smoothly curved edge of the element along the inside edge of the sole 11 and the fingers extending toward the outside edge of the sole. The second tread element 14 is similarly placed on the heel portion of the sole and the entire assembly is pressed into adhering relationship as by rolling with a roller. At the completion of this rolling there will be provided a unitary composite outsole assembly which is then applied to a lasted shoe upper, preferably by adhesion means, with the tread elements and the rand element in tread position. The shoe, including the outsole, is then vulcanized in the usual manner as by heating.

By the method of this invention it is possible to build a shoe with a deeply configured rubber outsole having protuberances and indentations in a regular design by providing a base element, cutting out one or more tread elements, and adhering them in tread position on the base element. As indicated in the description of the above typical embodiment, it is preferred to adhere the component parts of the composite outsole assembly element by making them of calendered unvulcanized rubber and then merely pressing the component parts into cohesive relation, depending thereby on the natural tackiness of the rubber to hold the elements in place until vulcanization. If it is desired, however, adhering means may be used in addition to hold the component parts together or alternatively, the component parts may be made of vulcanized rubber and these parts may be adhered together by adhering means, such as rubber cement. All of these methods are within the scope of the invention, unless otherwise specifically indicated.

The rubber used in making the unitary composite sole assembly described herein may be natural or synthetic rubber compounded in the usual manner with the customary compounding ingredients, which may include loading pigments, stiffeners, accelerators, anti-oxidants, and the like.

Having described my invention together with a typical embodiment of the same it is my intention that the invention be not limited to the details described and shown but rather construed broadly within the spirit and scope of the invention as defined by the following claims.

I claim:

1. The method of building an article of footwear which comprises forming a rubber outsole base element comprising heel, shank, and sole portions, cutting out or otherwise forming from rubber a separate configured tread element smaller in lateral dimensions than the corresponding portion of the base element, and also a rand element, applying the configured tread element to the tread side of the base element and applying the rand element to the tread side of the base element contiguous to the edge of said base element to produce a unitary composite outsole assembly, and affixing the unitary outsole assembly to a lasted shoe upper with the configured tread element in tread position.

2. The method of building an article of footwear which comprises forming an unvulcanized rubber outsole base element comprising heel, shank, and sole portions, cutting out or otherwise forming from unvulcanized rubber a plurality of separate configured tread elements each smaller in lateral dimensions than the corresponding portions of the base element, and also a rand element, pressing the configured tread elements on the tread side of the base element and pressing the rand element on the tread side of the base element contiguous to the edge of said base element to produce a unitary composite outsole assembly, applying the unitary outsole assembly to a lasted shoe upper comprising unvulcanized rubber with the configured tread elements in tread position, and vulcanizing the unvulcanized rubber in the shoe assembly.

3. The method of making an outsole assembly for an article of footwear which comprises forming a rubber outsole base element comprising heel, shank, and sole portions, cutting out or otherwise forming from rubber a separate configured tread element smaller in lateral dimensions than the corresponding portion of the outsole, and also a rand element, and affixing the configured tread elements to the tread side of the outsole and affixing the rand element to the tread side of the outsole contiguous to the edge of the outsole to produce a unitary composite outsole assembly.

4. The method of making an outsole assembly for an article of footwear which comprises forming an unvulcanized rubber outsole base element comprising heel, shank, and sole portions, cutting out or otherwise forming from unvulcanized rubber separate configured tread elements smaller in lateral dimensions than the corresponding portion of the outsole, and also a rand element, pressing the configured tread elements on the tread side of the outsole to and pressing the rand element on the tread side of the outsole contiguous to the edge of the outsole to produce a unitary composite outsole element, and vulcanizing the rubber.

5. The method of making an outsole assembly for an article of footwear which comprises preparing a base element consisting of a sheet of unvulcanized rubber material substantially free of deep configurations and having the outline of the bottom of the article of footwear including heel, shank, and sole portions, preparing a heel tread element smaller in lateral dimensions than the heel portion of the base element, a sole tread element smaller in lateral dimensions than the sole portion of the base element, and a rand element, affixing the tread elements to the heel and sole portions, respectively, of the base element, and affixing the rand element to the tread side of the base element contingous to the edge of the base element and substantially completely enclosing the heel tread element and the sole tread element.

RAYMOND H. BLANCHARD.